L. R. TURNER.
MARKER ATTACHMENT.
APPLICATION FILED MAR. 4, 1908.
901,853.
Patented Oct. 20, 1908.
3 SHEETS—SHEET 1.
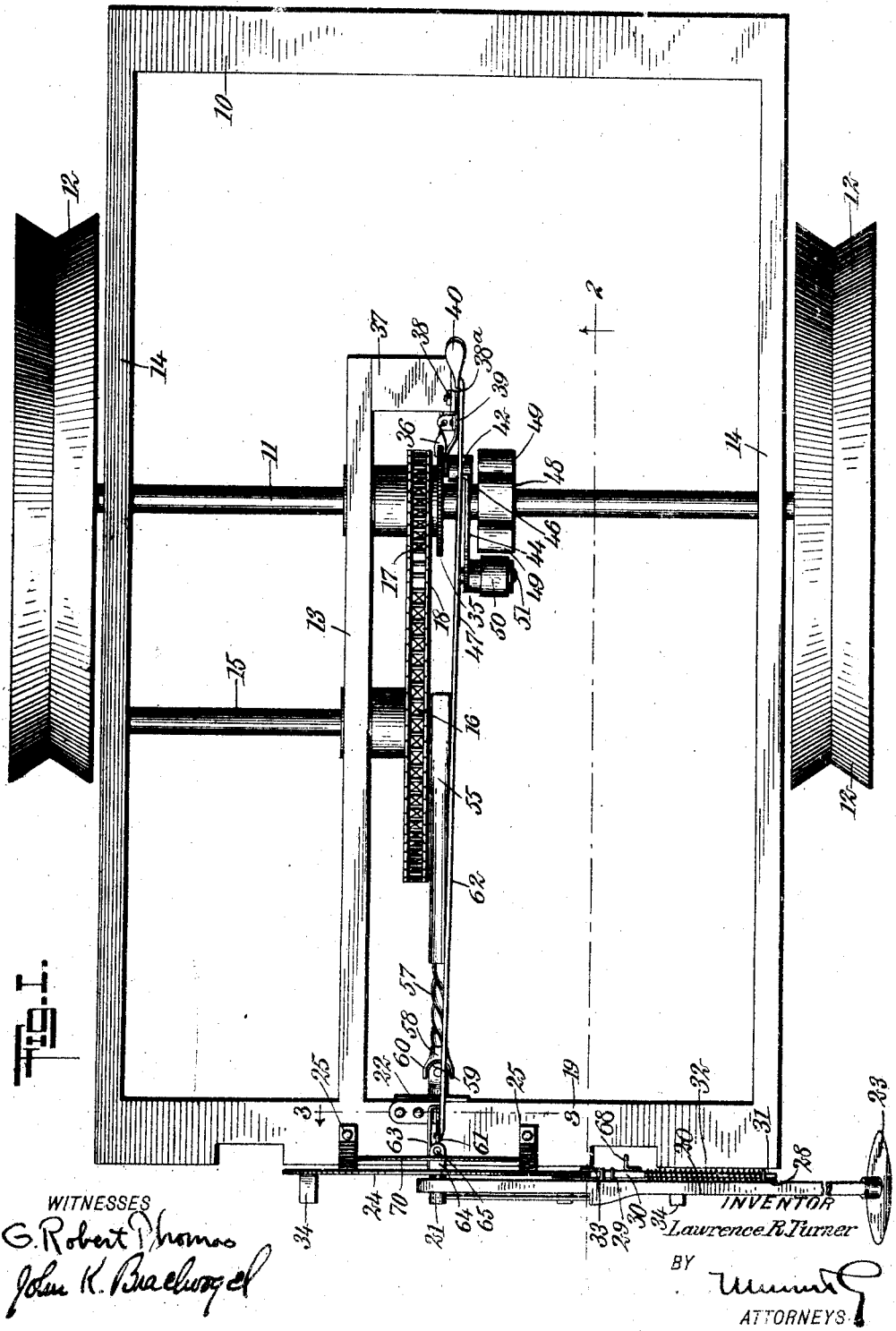

L. R. TURNER.
MARKER ATTACHMENT.
APPLICATION FILED MAR. 4, 1908.
901,853.
Patented Oct. 20, 1908.
3 SHEETS—SHEET 2.
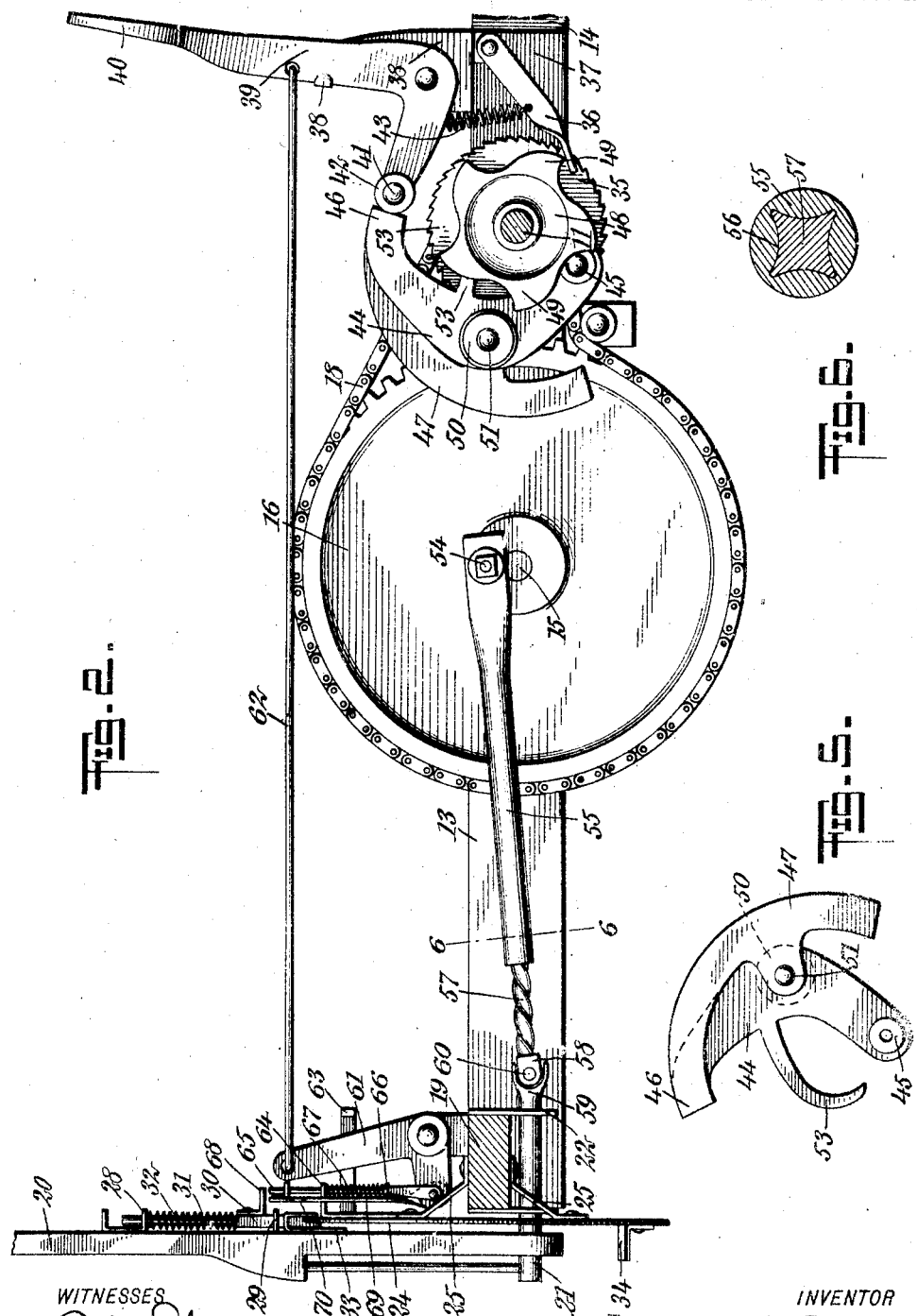
WITNESSES
G. Robert Thomas
John K. Brachvogel
INVENTOR
Lawrence R. Turner
BY
ATTORNEYS

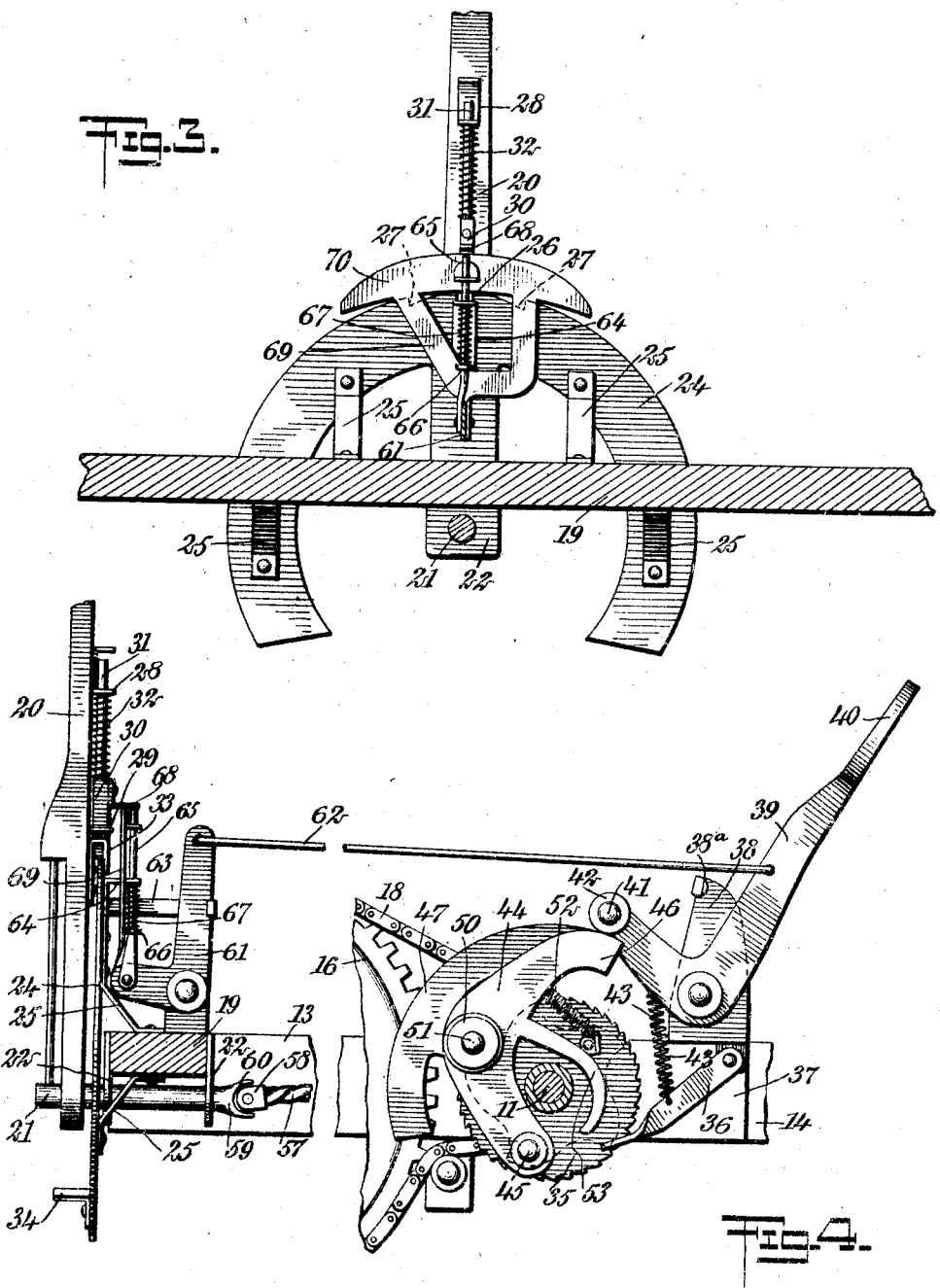

BEST AVAILABLE COPY

UNITED STATES PATENT OFFICE.

LAWRENCE RICHARD TURNER, OF LONG PINE, NEBRASKA.

MARKER ATTACHMENT.

No. 901,853.  Specification of Letters Patent.  Patented Oct. 20, 1908.

Application filed March 4, 1908. Serial No. 419,090.

*To all whom it may concern:*

Be it known that I, LAWRENCE R. TURNER, a citizen of the United States, and a resident of Long Pine, in the county of Brown and State of Nebraska, have invented a new and Improved Marker Attachment, of which the following is a full, clear, and exact description.

This invention relates to marker attachments, and more particularly to devices of this kind for automatically adjusting the markers of corn planters.

An object of the invention is to provide a simple and efficient marker attachment for corn and other planters, which is operable by the driving axle or other driving mechanism of the planter, and by means of which the marker for indicating the positions to be occupied by rows of plants or hills, can be automatically disposed into a plurality of positions, operative and inoperative.

A further object of the invention is to provide a device of the class described, which serves to control the marker of a corn planter or similar agricultural implement so that the operator of the planter can swing the marker from one position into another with practically no exertion, and by means of which he can further easily position the marker inoperatively.

A still further object of the invention is to provide mechanism used in combination with a marker of a corn or other planter, which serves to hold the marker in a plurality of operative positions, and in an inoperative position, which has means for locking the mechanism in an inoperative position, and by means of which the marker can be automatically adjusted from the driving mechanism of the planter.

The invention consists in the construction and combination of parts to be more fully described hereinafter and particularly set forth in the claims.

Reference is to be had to the accompanying drawings, forming a part of this specification, in which similar characters of reference indicate corresponding parts in all the views, and in which Figure 1 is a plan view of a portion of the frame of a corn planter having my invention applied thereto; Fig. 2 is a longitudinal section on the line 2—2 of Fig. 1; Fig. 3 is an enlarged transverse section on the line 3—3 of Fig. 1; Fig. 4 is an enlarged longitudinal section having parts broken away, and showing the means for mounting the marker and the means operable by the driving means of the planter, for controlling the marker; Fig. 5 is an enlarged side elevation showing a dog by means of which the movement of the driving shaft or axle of the planter is transmitted to the marker-controlling mechanism; and Fig. 6 is an enlarged transverse section on the line 6—6 of Fig. 2.

Before proceeding to a more detailed explanation of my invention, it should be clearly understood that the same is used with corn or other planters which employ markers. These markers often consist of pivotally mounted members carrying implements for tracing lines on the ground, to indicate the positions to be occupied by the rows of plants or hills of the same. A marking plow is usually employed for the purpose. When crops such as corn or the like are planted, the grains are usually inserted in the ground at predetermined intervals and in alinement. Unless the operator of the planter has some means for determining where these lines of seeds shall be positioned, it is a difficult matter to operate the planter so that the subsequent growth of the corn or other grain will be in the desired rows or alined hills. For this purpose, the planters are provided with markers which trace lines upon the ground, and thus indicate to the operator of the planter where the seeds have already been planted, and which thus provide him with means for guiding the implement. The markers are often of considerable weight, and therefore entail unnecessary labor when it is necessary to swing them from one position to another or to dispose them inoperatively. To obviate this extra work and the consequent loss of time, I provide means which are operable from the driving mechanism of the planter, for disposing the marker of the same into any one of a plurality of possible positions.

Referring more particularly to the drawings, 10 represents the frame of a corn or other planter having a transverse driving shaft or axle 11 carried by the wheels 12. The latter may be of any form, for example, as shown in the drawings, they may have the rims recessed to aid in covering up the seed which has been deposited and over which the wheels pass. The frame 10 comprises a longitudinal member 13 intermediate the side frame members 14 and having a bearing in which the shaft 11 is journaled. A second shaft 15 is rotatably carried by the member 13 and one of the members 14, and has a rigid gear or sprocket wheel 16 thereon. The gear wheel 16 is operatively connected by means of a chain 18, with a pinion or pulley 17 loosely mounted upon the shaft 11. The frame has a rear transverse member 19 upon which the marker 20 is mounted by means of a spindle 21 rigid with the marker and journaled in suitable bearing brackets 22 of the frame member 19. The marker, at the end has a disk or marker plow 23 which may be of any preferred or common form. Adjacent to the marker, the member 19 has mounted thereupon a segmental plate 24 secured in position by means of brackets 25, and having near the middle, at the outer edge, a central notch 26, and at each side of the latter further notches 27. The marker carries brackets 28 and 29 in which is slidably mounted a catch 30 having a shank 31 upon which is arranged a helical spring 32 which engages at the bracket 28 and at a shoulder of the catch, so that the latter is normally projected into engagement with the segmental plate 24. A U-shaped keeper 33 is carried by the marker and extends over the plate 24, and has an opening through which the catch 30 extends. The keeper serves to guide the marker with respect to the segmental plate. When the marker is centrally disposed with respect to the plate, the catch engages the notch 26 and serves to hold the marker in this central and inoperative position. The side notches 27, which are inclined to the edges of the notch 26, serve to engage the catch in case the catch should fail to slip into the notch 26 and the marker should thereupon tend to assume an operative position at one side or the other. Near the end of the segmental plate 24 are stops 34 which limit the downward movement of the marker in both directions, and which are engaged by the latter when in operative position, to trace indications or markings upon the ground.

Rigid with the pulley 17 is a ratchet-wheel 35 which is engaged by a pawl 36 mounted upon a support 37 at the end of the frame member 13. A bracket 38 is carried by the latter, adjacent to the pawl 36 and has pivotally mounted thereupon, a bell crank lever 39, one end of which is formed into a pedal 40. The other end or arm of the lever 39 has a laterally extending pin 41 upon which is a roller 42 for a purpose which will appear hereinafter. The pawl 36 is connected by means of a spring 43 with the lever 39, and is normally held in engagement with the ratchet wheel 35 by the spring.

A dog 44 is pivoted by means of a suitable pin 45 upon the ratchet 35 and has at the end remote from the pivoted end, a nose 46 adapted to engage the roller 42. The dog has a curved guideway 47 along which the roller 42 can travel and by means of the bell crank lever 39 can be held inoperative, as will be shown hereafter. Adjacent to the dog 44, the shaft 11 carries a rigid cam wheel 48 having a plurality of lobes or teeth 49, each of which is arranged operatively to engage a roller 50 mounted by means of a suitable pin 51 upon the dog 44 intermediate the ends thereof. The dog 44 is secured by means of a spring 52 to the ratchet wheel at a point remote from the point of attachment by means of the pin 45. The spring 52 normally holds the dog in position such that the nose 46 of the same engages the roller 42 of the bell crank lever 39. The dog has an arm 53 which is curved partly about the shaft 11 and serves to limit the movement of the dog about its pivotal pin 45.

The gear wheel 16 has a crank pin 54 to which is operatively secured the end of a pitman 55. The latter has a longitudinal spiral bore 56 into which fits a correspondingly formed spiral stem 57. The latter, at the end remote from the pitman 55 has a head 58 which, with a suitably formed head 59 of the spindle 21, forms a universal joint 60. By means of this connection the rotary movement of the gear-wheel 16 serves to rotate the spindle about its longitudinal axis, and with the spindle, the marker 20.

A bell crank lever 61 is pivoted to the rear frame member 19 and has an arm operatively connected by means of a link or rod 62 with the bell crank lever 39. A yoke 63 carried by the plate 24 serves as a guide for the lever 61. The plate 24 has a bracket 64 which slidably carries a rod 65 having a shoulder 66 and a spring 67. The rod is pivoted to one end of the bell crank lever 61 and is normally held out of engagement with the shoulder 68 of the catch 30. A frame 69 is carried by the bell crank lever and is rigid with the rod 65. The frame, at the upper end, has a curved and laterally extended portion 70 which is adapted to engage the shoulder 68 of the catch 30 in a plurality of positions of the marker, where the rod 65 will not engage the shoulder when the bell crank lever is operated. By means of the link 62 and the lever 61, the catch 30 can be released through the operation of the lever 39, to permit the marker to be disposed into an operative, from an inoperative position.

The driving shaft or axle 11 rotates continuously in one direction when the planter is being propelled forward in the course of its operation, and serves to drive the gear wheel 16 when the lever 39 is displaced to permit the operative engagement of the cam wheel 48 with the roller 50 of the dog 44. When the operator desires to change the position of the marker he throws the lever 39 forward by pressing upon the pedal, and displaces the roller 42 so that the spring 52 pulls the dog into a position such that the roller 50 is engaged by one of the lobes 49. As the cam wheel is rigid with the shaft 11 it turns the dog as it rotates, and the latter correspondingly actuates the pinion 17. The pinion, through the chain 18, drives the gear wheel, and the latter reciprocates the pitman 55. The stem 57 cannot move in the direction of its length and owing to the spiral engagement of the stem with the pitman, the spindle 21 is rotated to swing the marker in one direction or the other. The movement of the lever 39 permits the roller 42 to travel along the edge of the guideway 47 until the end of the latter is reached, whereupon the lever 39, under the influence of the spring 43, returns to its normal position and is again engaged by the nose 46 of the dog. The engagement of the pawl 36 with the ratchet 35 is such that the dog is free to turn in one direction and is prevented from a corresponding movement in the opposite direction. When the dog is stopped by the engagement of the nose 46 with the roller 42, the cam lobe 49 which is in engagement with the roller 50 forces the same outward in a radial direction and swings the dog into an inoperative position, which permits the rotation of the cam wheel without the corresponding actuation of the dog. The latter is held in an inoperative position by means of the pawl 36 and the ratchet 35, as is shown most clearly in Fig. 2. The bracket 38 upon which the lever 39 is pivoted has a stop 38ᵃ which limits the movement of the lever in the direction of the marker.

The arrangement of the parts is such, that when the gear wheel 16 makes one-half of a revolution the marker is moved from one operative position to the opposite operative position, that is, a quarter of a revolution of the gear wheel suffices to swing the marker through an arc equal, substantially, to one-quarter of a circle, that is, to move it from an inoperative to an operative position, or vice versa. The pinion and the gear wheel are so proportioned that the former makes a complete revolution when the gear wheel makes one-quarter of a revolution.

Having thus described my invention, I claim as new, and desire to secure by Letters Patent:

1. In a planter, a marker arranged to be positioned inoperatively and operatively, driving mechanism, connecting means between said marker and said driving mechanism, a normally inoperative device whereby said connecting means can be rendered operative to permit the marker to be actuated by said driving mechanism, said device automatically becoming inoperative when said driving mechanism has executed a predetermined movement, means for holding said marker in an operative position, means for locking said marker in an inoperative position, and means controlled by said device for releasing said locking means.

2. In a planter, in combination, a marker arranged to be swung into a plurality of positions, a driving axle, means for swinging said marker, a dog controlling said means, means for operating said dog from said axle, said dog being normally inoperative, means for rendering said dog operative, means for locking said marker in an inoperative position, and means for controlling said locking means from said means for controlling said dog.

3. In a planter, in combination, a marker arranged to be swung into a plurality of positions, a driving axle having a pinion loose thereupon, a gear wheel operatively connected with said pinion, means for actuating said marker from said gear wheel, a dog pivoted with respect to said pinion, a member rigid with said shaft and adapted to engage said dog to drive said pinion, means for normally holding said dog out of engagement with said member, means for releasing said dog, and means tending to force said dog into engagement with said member.

4. In a planter, in combination, a marker arranged to be swung into a plurality of positions, driving mechanism, means for operatively connecting said driving mechanism and said marker, and including an independently movable member controlling said marker, a member controlled by said driving mechanism, a dog secured to said independently movable member and pivoted with respect thereto, said member controlled by said driving mechanism being adapted to engage said dog in a predetermined position of the latter to operate said independently movable member, and releasable means for holding said dog out of engagement with said member controlled by said driving mechanism.

5. In a planter, in combination, a marker arranged to be swung into a plurality of positions, driving mechanism, means for operatively connecting said driving mechanism and said marker to swing the same, and including a member movable independently of said driving mechanism and controlling said marker, a cam controlled by said driving mechanism, a dog secured to said member and pivoted with respect thereto, said cam being adapted to engage said dog in a predetermined position of the same to operate said member, and releasable means for holding said dog out of engagement with said cam, said dog being formed to displace said last-mentioned means into an inoperative position while said dog is being rotated through a portion of a revolution by said cam.

6. In a planter, in combination, a marker arranged to be swung into a plurality of positions, driving mechanism, means for operatively connecting said driving mechanism and said marker, and including a member movable independently of said driving mechanism and controlling said marker, a cam controlled by said driving mechanism, a dog pivoted with respect to said member, a pawl and a ratchet adapted to hold said member against movement in one direction, said cam being adapted to engage said dog in an operative position of the same to rotate said member, releasable means for holding said dog inoperative, said dog being formed to displace said last-mentioned means into an inoperative position while said dog is being rotated through a part of a revolution by said cam, means for causing said last mentioned means to return to an operative position, and means tending to hold said dog in engagement with said cam, said dog, when engaging said last mentioned means, being adapted to be forced into an inoperative position by said cam member and being held in such position by said ratchet and said pawl.

7. In a planter, a marker arranged to be swung into a plurality of positions, a driving shaft having a pinion loose thereon, means for operatively connecting said pinion and said marker whereby a movement of rotation of said pinion serves to swing said marker, a dog pivoted with respect to said pinion, a cam member rigid on said shaft and adapted to engage said dog to operate said pinion, a member adapted to be engaged by said dog whereby the latter is held inoperative, said member being arranged to be released, said dog having a guideway arranged to permit said member to travel inoperatively therealong, said member returning to an operative position after it passes from said guideway, means for normally holding said member in an operative position, and means tending to hold said dog normally in engagement with said cam member.

8. In a planter, a marker arranged to be swung into a plurality of positions, means for locking said marker in position, a driving shaft having a pinion loose thereon, means for operatively connecting said pinion and said marker whereby said pinion serves to swing said marker, a ratchet rigid with said pinion, a dog pivoted on said ratchet, a cam member rigid with said shaft and adapted to engage said dog whereby said pinion is forced to rotate with said shaft, a lever arranged to engage said dog to hold it inoperative with respect to said cam member, means controlled by said lever for releasing said locking means, a pawl engaging said ratchet and preventing the rotation of said pinion in one direction, said dog having a guideway adapted to engage said lever to hold the same inoperative while said cam member is rotating said dog through a portion of a revolution, and means tending normally to hold said dog in engagement with said cam member, said dog when engaging said lever, being forced into an inoperative position by said cam member, and being held in such inoperative position by said ratchet and said pawl.

9. In a planter, a marker arranged to swing into a plurality of positions, driving means, a rotatable member, means for intermittently operating said rotatable member by said driving means, a stem having a universally jointed connection with said marker, and an elongated member engaging said stem and mounted upon said rotatable member, said stem and said elongated member having a spiral engagement and being movable longitudinally of one another, whereby a movement of rotation of said rotatable member is converted into a swinging movement of said marker.

10. In a planter, a marker arranged to swing into a plurality of positions, a driving shaft having a pinion loose thereon, a second shaft having a wheel, means for operatively connecting said pinion and said wheel, a rod pivoted to said wheel and having a spiral bore, a spiral stem arranged in said spiral bore and having a universal joint connection with said marker, a dog pivoted with respect to said pinion, a member rigid with said shaft and adapted to engage said dog to drive said pinion, releasable means for holding said dog out of engagement with said member rigid with said shaft, said dog being formed to permit said releasable means to return to an operative position after said dog has completed a predetermined movement, whereby said dog engages said releasable member and is forced into an inoperative position by engagement with said member rigid with said shaft.

In testimony whereof I have signed my name to this specification in the presence of two subscribing witnesses.

LAWRENCE RICHARD TURNER.

Witnesses:
F. A. STOUGHTON,
C. A. ROSE.